US008327575B1

(12) United States Patent
Zalewski

(10) Patent No.: US 8,327,575 B1
(45) Date of Patent: Dec. 11, 2012

(54) FISHING ROD HOLDER ATTACHABLE TO A DOCK

(76) Inventor: Tadeusz Zalewski, Garfield, NJ (US)

( * ) Notice: Subject to any disclaimer, the term of this patent is extended or adjusted under 35 U.S.C. 154(b) by 286 days.

(21) Appl. No.: 12/914,654

(22) Filed: Oct. 28, 2010

(51) Int. Cl.
*A01K 97/10* (2006.01)
(52) U.S. Cl. ......... 43/21.2; 248/519; 248/520; 248/534; 248/538
(58) Field of Classification Search ............ 43/21.2; 248/511, 519, 520, 534, 538, 539, 222.11; 114/218, 230.1, 230.29
See application file for complete search history.

(56) References Cited

U.S. PATENT DOCUMENTS

| | | | | |
|---|---|---|---|---|
| 371,777 A * | 10/1887 | McCabe | ................. | 248/520 |
| 2,360,402 A * | 10/1944 | Determan | ................. | 43/21.2 |
| 2,561,046 A * | 7/1951 | Brooks | ................. | 248/534 |
| 2,674,426 A * | 4/1954 | Hiles | ................. | 248/538 |
| 3,074,674 A * | 1/1963 | Hill | ................. | 248/538 |
| 3,246,865 A * | 4/1966 | Latimer | ................. | 43/21.2 |
| 3,259,346 A * | 7/1966 | Rogers | ................. | 43/21.2 |
| 3,381,925 A * | 5/1968 | Higuchi | ................. | 410/116 |
| 3,708,141 A * | 1/1973 | Friedgen et al. | ................. | 248/540 |
| 3,783,547 A * | 1/1974 | Bystrom et al. | ................. | 43/21.2 |
| 3,881,269 A * | 5/1975 | Timmons | ................. | 43/21.2 |
| 4,064,811 A * | 12/1977 | Copeland | ................. | 43/21.2 |
| 4,124,190 A * | 11/1978 | Wheeler | ................. | 248/538 |
| D255,259 S * | 6/1980 | Nelson | ................. | D22/147 |
| 4,235,409 A * | 11/1980 | Cummings | ................. | 248/538 |
| 4,297,963 A * | 11/1981 | Beacom | ................. | 114/218 |
| 4,354,445 A * | 10/1982 | Kafka et al. | ................. | 114/218 |
| 4,637,156 A * | 1/1987 | Simmons | ................. | 43/21.2 |
| 4,676,019 A * | 6/1987 | Engles | ................. | 43/21.2 |
| 4,803,794 A * | 2/1989 | Lopez | ................. | 43/21.2 |
| 5,120,016 A * | 6/1992 | Dysarz | ................. | 43/21.2 |
| 5,210,971 A * | 5/1993 | Efantis | ................. | 43/21.2 |
| 5,247,759 A * | 9/1993 | Noriega | ................. | 43/21.2 |
| 5,331,761 A * | 7/1994 | Kuthy | ................. | 43/21.2 |
| 5,542,367 A * | 8/1996 | DuBois et al. | ................. | 114/218 |
| 5,560,137 A * | 10/1996 | Herring | ................. | 43/21.2 |
| 5,566,495 A * | 10/1996 | Kim et al. | ................. | 43/21.2 |
| 5,625,974 A * | 5/1997 | Demaio | ................. | 43/21.2 |
| 5,632,112 A * | 5/1997 | Steinborn | ................. | 43/21.2 |
| 5,662,306 A * | 9/1997 | Dysarz | ................. | 43/21.2 |
| 5,685,517 A * | 11/1997 | Salibra | ................. | 248/539 |
| 5,690,042 A * | 11/1997 | Bentley | ................. | 114/218 |
| 5,724,763 A * | 3/1998 | Rasmussen | ................. | 43/21.2 |
| 5,813,163 A * | 9/1998 | Dysarz | ................. | 43/21.2 |
| 5,873,319 A * | 2/1999 | Bentley | ................. | 114/218 |
| 5,895,017 A * | 4/1999 | McMillan, Jr. | ................. | 248/519 |

(Continued)

FOREIGN PATENT DOCUMENTS

DE 19707904 A1 * 9/1998

(Continued)

*Primary Examiner* — Darren W Ark

(57) ABSTRACT

A fishing rod holder device for temporarily securing to a dock. The device features a mounting base, a pole holding tube extending upwardly at an angle from the mounting base, a channel aperture disposed in the mounting base; and a locking means for securing the mounting base to a dock in a tool-free and hardware-free manner. The locking means features a locking means base dispose don the mounting base, a sliding tube telescopically received in the locking means base, a shaft extending through both the sliding tube and locking means base, a first T-bar disposed on the shaft above the sliding tube and a second T-bar disposed on the shaft below the mounting base. The second T-bar can be moved upwardly toward the mounting base to compress planks of a dock to secure the device to the dock.

20 Claims, 5 Drawing Sheets

U.S. PATENT DOCUMENTS

| | | | |
|---|---|---|---|
| 5,941,191 A * | 8/1999 | Dysarz | 114/218 |
| 5,967,075 A * | 10/1999 | Johansen | 43/21.2 |
| 6,045,109 A * | 4/2000 | Mashburn et al. | 43/21.2 |
| 6,088,946 A * | 7/2000 | Simmons | 43/21.2 |
| 6,295,942 B1 * | 10/2001 | Leonardson | 114/218 |
| 6,497,067 B1 * | 12/2002 | King | 43/21.2 |
| 6,647,911 B1 * | 11/2003 | Solterbeck | 114/230.29 |
| 6,898,893 B1 * | 5/2005 | Mukdaprakorn | 43/21.2 |
| 7,246,782 B2 * | 7/2007 | Crookham et al. | 248/519 |
| 7,509,769 B2 * | 3/2009 | Wilcox et al. | 43/21.2 |
| 7,575,215 B1 * | 8/2009 | Clark et al. | 43/21.2 |
| 7,908,786 B2 * | 3/2011 | Bailey | 43/21.2 |
| 8,033,046 B2 * | 10/2011 | Morehead | 43/21.2 |
| D662,745 S * | 7/2012 | Zalewski | D6/552 |
| 2005/0039377 A1 * | 2/2005 | Clary | 43/21.2 |

FOREIGN PATENT DOCUMENTS

| | | | |
|---|---|---|---|
| EP | 1645185 A1 * | 4/2006 | |
| JP | 01181736 A * | 7/1989 | |
| JP | 2000270746 A * | 10/2000 | |
| JP | 2001169704 A * | 6/2001 | |
| WO | WO 2004030449 A1 * | 4/2004 | |
| WO | WO 2007091861 A1 * | 8/2007 | |

* cited by examiner

FISHING ROD HOLDER ATTACHABLE TO A DOCK

FIELD OF THE INVENTION

The present invention is directed to a fishing accessory, more particularly to a fishing rod holding device that can be secured to a dock temporarily.

BACKGROUND OF THE INVENTION

Fishing rod holders that can be secured to a dock typically require labor-intensive installation with screws, resulting in a permanent attachment to the dock.

The present invention features a novel fishing rod holder device that can be temporarily secured to a dock. The device of the present invention stabilizes and secures fishing rods on a dock and does not require screws of bolts (or tools) for installation.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features a fishing rod holder device. In some embodiments, the fishing rod holder device comprises a mounting base having a top surface and a bottom surface; a pole holding tube extending upwardly from the top surface of the mounting base, the pole holding tube is positioned at an angle with respect to the top surface of the mounting base; a drainage hole disposed in the mounting base below the pole holding tube and a channel aperture disposed in the mounting base, both the drainage hole and the channel aperture extend from the top surface of the mounting base to the bottom surface of the mounting base; and a locking means for securing the mounting base to a dock.

In some embodiments, the locking means comprises a locking means base extending upwardly from the top surface of the mounting base, the locking means base has a first end and a second end, wherein a first center channel is disposed in the locking means base extending from the first end to the second end, the first center channel is aligned with the channel aperture disposed in the mounting base; a sliding tube slidably and telescopically received in the first center channel of the locking means base, a first end of the sliding tube extends above the first end of the locking means and a second end of the sliding tube is housed within the first center channel of the locking means base, wherein a second center channel is disposed in the sliding tube extending from the first end to the second end; a spring housed in the first center channel, the spring is sandwiched between the second end of the sliding tube and the top surface of the mounting base, the spring biases the sliding tube upwardly; a shaft extending through the second center channel of the sliding tube, the first center channel of the locking means base, and the channel aperture in the mounting base, wherein threading is disposed on at least a portion of the shaft at or near the first end, the shaft can be rotated in a first direction or a second direction; a first T-bar disposed on a first end of the shaft and a second T-bar disposed on a second end of the shaft, the first T-bar is positioned above the first end of the sliding base and the second T-bar is positioned below the bottom surface of the mounting base; and a wing nut disposed on the threading on the shaft in between the first end of the sliding tube and the first T-bar, the wing nut can move in a first direction and a second direction on the threading wherein when the wing nut is moved in the first direction on the threading the wing nut moves toward the second T-bar effectively pushing down on the sliding tube, compressing the spring, and moving the shaft upwardly effectively raising the second T-bar toward the bottom surface of the mounting base, when the wing nut is moved in the second direction on the threading, the wing nut moves toward the first T-bar.

The present invention also features a method of securing a fishing rod to a dock. In some embodiments, the method comprises providing a fishing rod holder device; sliding the second T-bar in between two parallel planks of a dock; rotating the first T-bar between about 10 to 170 degrees (e.g., 90 degrees) effectively rotating the second T-bar between about 10 to 170 degrees (e.g., 90 degrees); rotating the wing nut in the first direction causing the wing nut to push downwardly onto the first end of the sliding tube, the sliding tube to compress the spring, and the shaft to move upwardly effectively raising the second T-bar toward the bottom surface of the mounting base, the wing nut is rotated until the second T-bar and mounting base squeeze the planks of the docks sufficiently to immobilize the mounting base; and inserting a fishing rod into the pole holding tube.

In some embodiments, the angle is between about 0 to 20 degrees. In some embodiments, the angle is between about 20 to 40 degrees. In some embodiments, the angle is between about 40 to 60 degrees. In some embodiments, the angle is between about 60 to 90 degrees. In some embodiments, the locking means base is generally cylindrical. In some embodiments, the fishing rod holder device further comprises a lock nut disposed on the threading on the shaft below the first T-bar.

DESCRIPTION OF PREFERRED EMBODIMENTS

Figure 1:
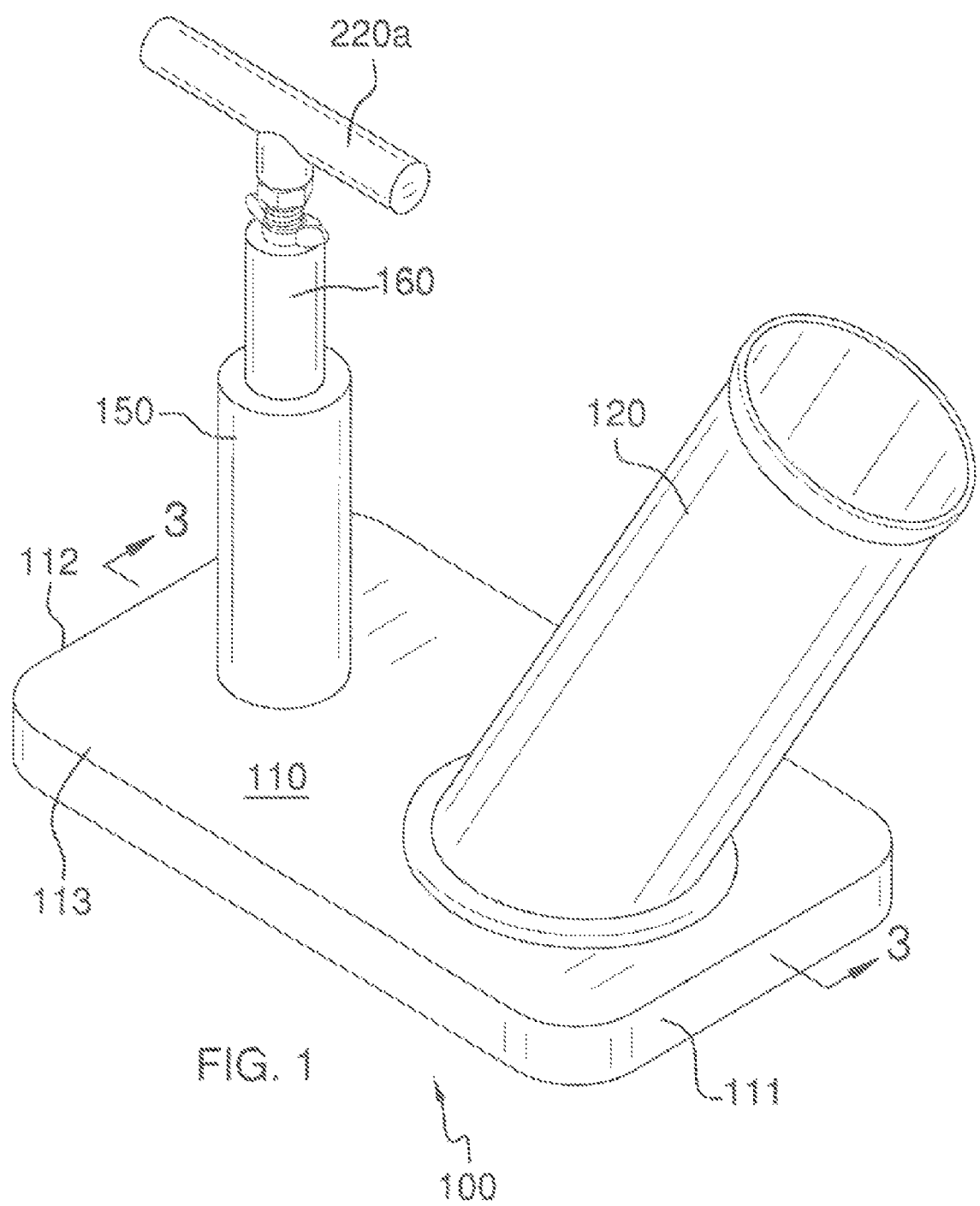
FIG. 1 is a perspective view of the fishing rod holder device of the present invention.
Figure 2:
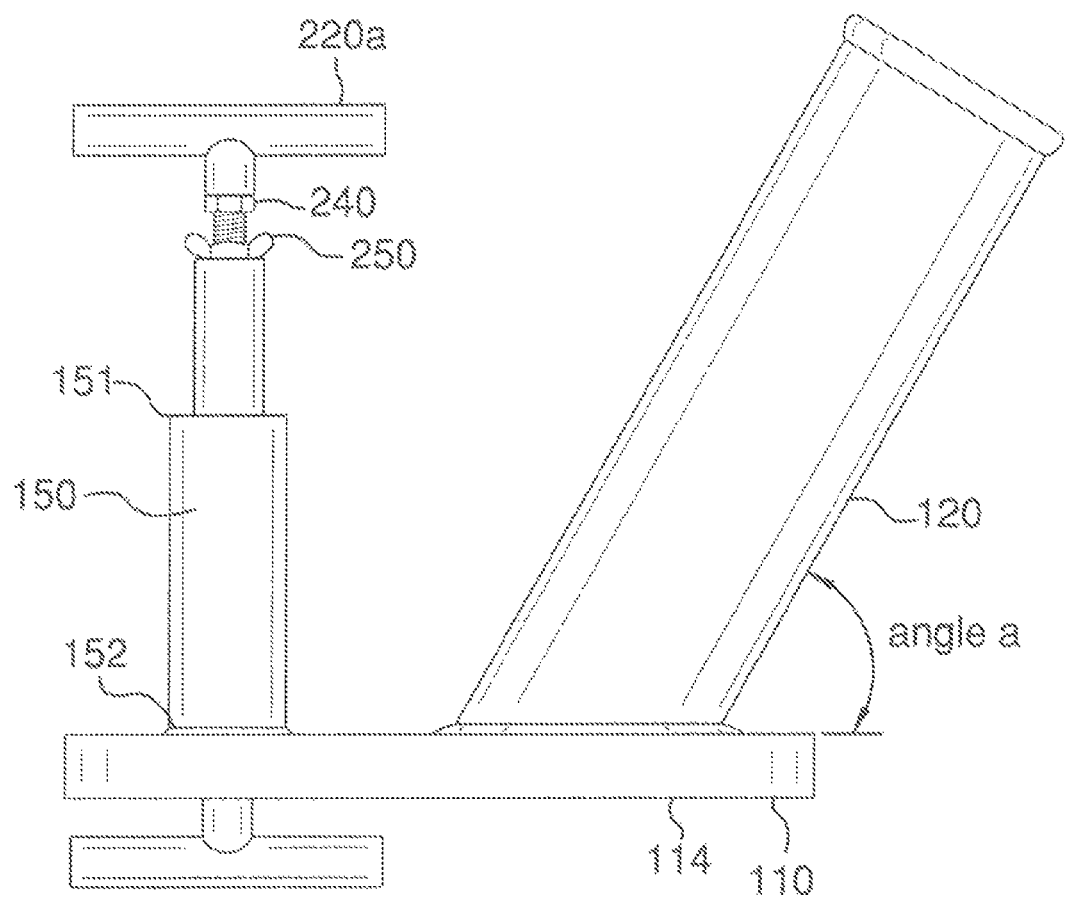
FIG. 2 is a side view of the fishing rod holder device of the present invention.
Figure 3:
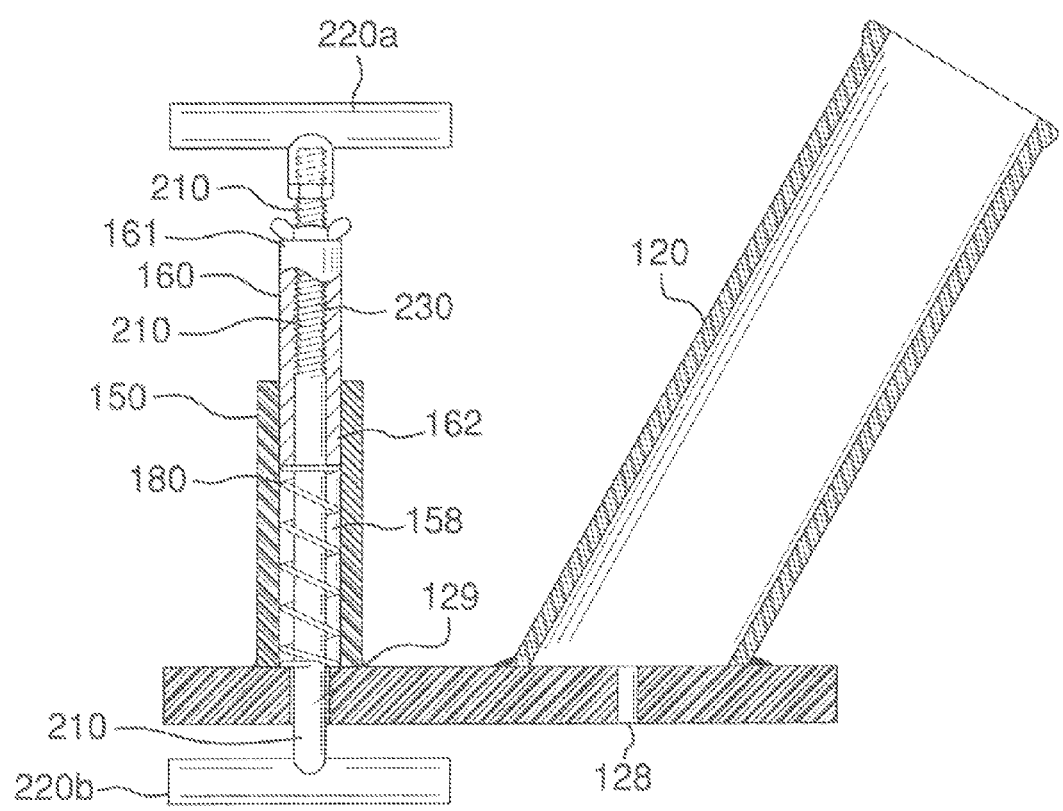
FIG. 3 is a side cross sectional view of the fishing rod holder device of the present invention.

Referring now to FIGS. 1-5, the present invention features a novel fishing rod holder device 100 that can be temporarily secured to a dock. The fishing rod holder device 100 of the present invention stabilizes and secures fishing rods on a dock and does not require screws of bolts (or tools) for installation.

The fishing rod holder device 100 of the present invention comprises a mounting base 110 having a top surface 113, a bottom surface 114, a first side edge 111, and a second side edge 112. Extending upwardly from the top surface 113 of the mounting base 110 (e.g. near the first side edge 111 of the mounting base 110) is a pole holding tube 120 (e.g., a generally hollow pole holding tube 120) adapted to hold (e.g., snugly) the handle area a fishing rod 101. The pole holding tube 120 is positioned at an angle with respect to the top surface 113 of the mounting base 110 (e.g., see angle a of FIG. 2). For example, in some embodiments, the angle (e.g., angle a) is between about 0 to 10 degrees. In some embodiments, the angle (e.g., angle a) is between about 10 to 20. degrees. In some embodiments, the angle (e.g., angle a) is between about 20 to 30 degrees. In some embodiments, the angle (e.g., angle a) is between about 30 to 40 degrees. In some embodiments, the angle (e.g., angle a) is between about 40 to 50 degrees. In some embodiments, the angle (e.g., angle a) is between about 50 to 60 degrees. In some embodiments, the angle (e.g., angle a) is between about 60 to 70 degrees. In some embodiments, the angle (e.g., angle a) is between about 70 to 80 degrees. In some embodiments, the angle (e.g., angle a) is between about 80 to 90 degrees. In some embodiments, the angle (e.g., angle a) between the pole holding tube 120 and the top surface 113 of the mounting base 110 is adjustable.

In some embodiments, a drainage hole 128 is disposed in the mounting base below the position of the pole holding tube 120. The drainage hole allows passage of water or debris that enters into the pole holding tube 120. In some embodiments, the internal diameter of the pole holding tube 120 is adjustable, for example to accommodate various sizes of fishing rods.

The fishing rod holder device 100 of the present invention further comprises a novel locking means for securing the mounting base 110 to a dock 102. The locking means allows the mounting base 110 to be secured temporarily to a dock 102 with no hardware or tools. The locking means may comprise a locking means base 150 extending upwardly from the mounting base 110, for example near the second side edge 112. The locking means base 150 may be generally cylindrical, however the locking means base 150 is not limited to this shape. A first center channel 158 is disposed in the center of the locking means base 150 extending from the first end 151 to the second end 152 of the locking means base 150. The first center channel 158 is aligned with a channel aperture 129 disposed in the mounting base 110.

A sliding tube 160 is slidably and telescopically received in the first center channel 158 of the locking means base 150. The sliding tube can slide up and down within the first center channel 158 of the locking means base 150. The first end 161 of the sliding tube 160 extends above the first end 151 of the locking means base 150 and the second end 162 of the sliding tube 160 is housed within the first center channel 158 of the locking means base 150. A second center channel is disposed in the center of the sliding tube 160 extending from the first end 161 to the second end 162 of the sliding tube 160.

Sandwiched between the second end 162 of the sliding tube 160 and the mounting base 110 within the first center channel 158 is a spring 180. The spring 180 biases the sliding tube 160 upwardly (e.g., in the direction of the first end 161 of the sliding tube 160), for example the spring 180 forces the second end 162 of the sliding tube 160 in the direction of the first end 161 of the sliding tube 160.

A shaft 210 extends through the second center channel of the sliding tube 160, the first center channel 158 of the locking means base 150, and the channel aperture 129 in the mounting base 110. Disposed on the first end of the shaft 210 is a first T-bar 220a (e.g., handle) and disposed on the second end of the shaft 210 is a second T-bar 220b (e.g., handle). The second T-bar 220b is positioned below the bottom surface 114 of the mounting base 110.

Threading 230 is disposed along at least a portion of the shaft 210 at or near the first end of the shaft 210. The threading 230 engages threading lining the second center channel of the sliding tube 160. The shaft 210 can be rotated in a first direction or second direction.

In some embodiments, a lock nut 240 is disposed on the threading 230 on the shaft 210 below the first T-bar 220a. A wing nut 250 is disposed on the threading 230 on the shaft 210 in between the first end 161 of the sliding tube 160 and the lock nut 240 (or in between the first end 161 of the sliding tube 160 and the first T-bar 220a). The wing nut 250 can move in a first direction and a second direction on the threading 230. When the wing nut 250 is moved in the first direction on the threading 230, the wing nut 250 moves toward the second T-bar 220b. When the wing nut 250 is moved in the second direction on the threading 230, the wing nut 250 moves toward the first T-bar 220a.

Figure 4:
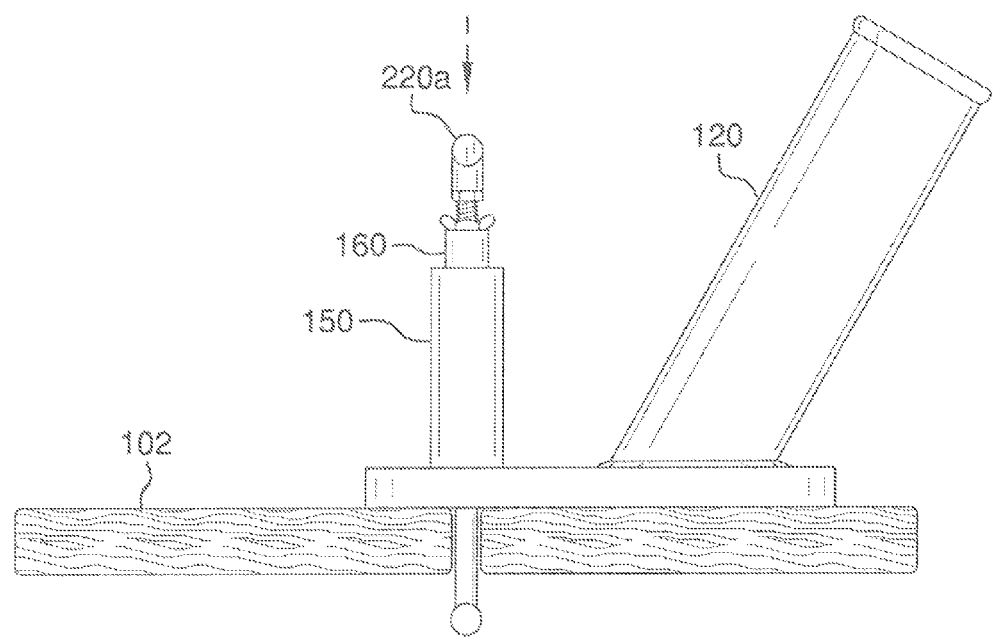
FIG. 4 is an in-use view of the fishing rod holder device of the present invention.
Figure 5:
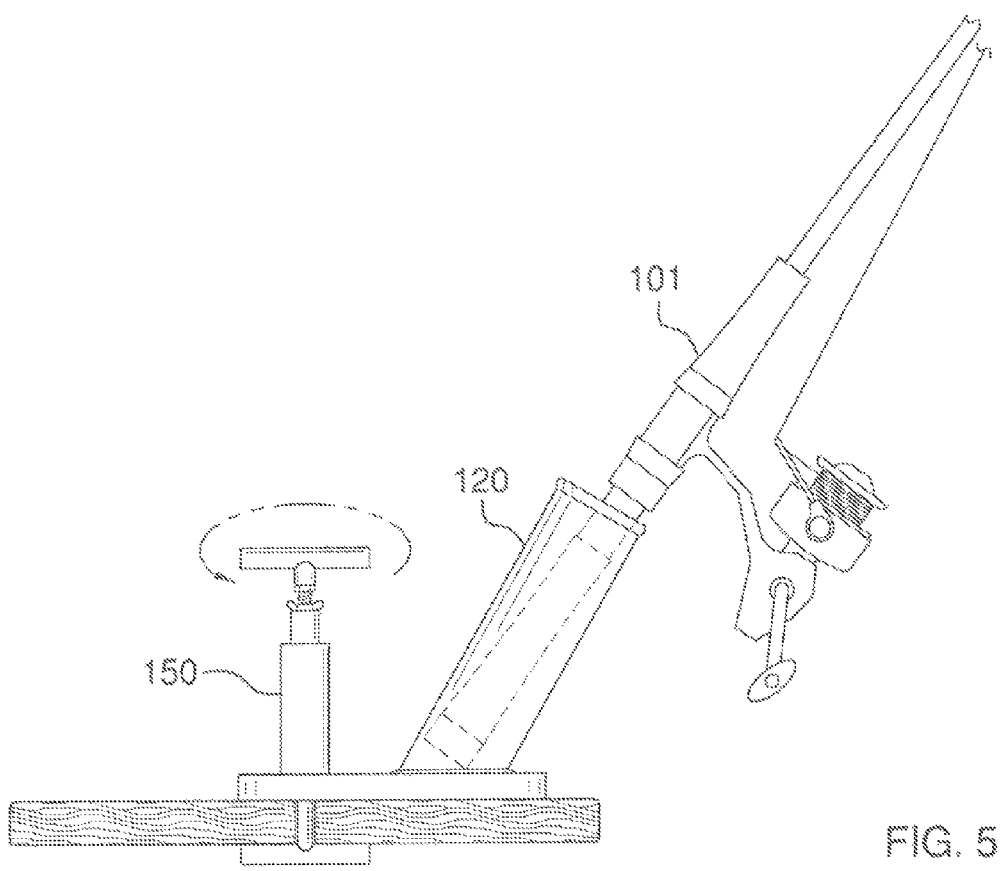
FIG. 5 is an in-use view of the fishing rod holder device of the present invention.

The present invention also features a method of securing a fishing rod to a dock. For example, to use the fishing rod holder device 100 of the present invention, a user can slide the second T-bar 220b in between two planks of a dock (the second T-bar 220b is parallel to the planks), as shown in FIG. 4, and then rotate the first T-bar 220a about 90 degrees effectively rotating the second T-bar 220b about 90 degrees such that the second T-bar 220b runs perpendicularly to the two planks, as shown in FIG. 5. In some embodiments, the first T-bar 220a is rotated between about 10 to 170 degrees, effectively rotating the second T-bar 220b between about 10 to 170 degrees.

To tighten the mounting base 110 on the dock (e.g., to lessen the space between the bottom surface of the mounting base 110 and the second T-bar 220b), a user can twist the wing nut 250 in a first direction. Twisting the wing nut 250 in the first direction causes the wing nut 250 to push downwardly onto the first end 161 of the sliding tube 160, which causes the sliding tube 160 to compress the spring 180 and the shaft 210 to move upwardly, effectively raising the second T-bar 220b (e.g., moving the second T-bar 220b toward the bottom surface 114 of the mounting base 110). The second T-bar 220b and mounting base 110 together squeeze the dock planks, securing the device 100 to the dock. To remove the fishing rod holder device 100, the wing nut 250 is rotated in the second direction until enough space is made between the second T-bar 220b and the mounting base 110, allowing the second T-bar 220 to be rotated 90 degrees and removed from in between the two planks of the dock.

The fishing rod holder device 100 of the present invention may be constructed from a variety of materials and in a variety of sizes. For example, in some embodiments, the fishing rod holder device 100 is constructed from a material comprising plastic and/or metal (e.g., steel).

In some embodiments the pole holding tube 120 is between about 4 to 6 inches in length as measured from the first end to the second end. In some embodiments the pole holding tube 120 is between about 6 to 8 inches in length as measured from the first end to the second end. In some embodiments the pole holding tube 120 is between about 8 to 10 inches in length as measured from the first end to the second end. In some embodiments the pole holding tube 120 is between about 10 to 12 inches in length as measured from the first end to the second end. In some embodiments the pole holding tube 120 is more than about 12 inches in length.

As used herein, the term "about" refers to plus or minus 10% of the referenced number. For example, an embodiment wherein the pole holding tube 120 is about 10 inches in length includes a pole holding tube 120 that is between 9 and 11 inches in length.

The disclosures of the following U.S. Patents are incorporated in their entirety by reference herein: U.S. Pat. No. 5,625,974; U.S. Pat. No. 5,813,163; U.S. Pat. No. 6,898,893; U.S. Pat. No. 6,497,067; U.S. Pat. No. 5,632,112; U.S. Pat. No. 5,967,075; U.S. Pat. No. 5,566,495; U.S. Pat. No. D255,259.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A fishing rod holder device comprising:
   (a) a mounting base having a top surface and a bottom surface;
   (b) a pole holding tube extending upwardly from the top surface of the mounting base, the pole holding tube is positioned at an angle with respect to the top surface of the mounting base;
   (c) a drainage hole disposed in the mounting base below the pole holding tube and a channel aperture disposed in the mounting base, both the drainage hole and the channel aperture extend from the top surface of the mounting base to the bottom surface of the mounting base; and
   (d) a locking means for securing the mounting base to a dock, said locking means comprising:
      (i) a locking means base extending upwardly from the top surface of the mounting base, the locking means base has a first end and a second end, wherein a first center channel is disposed in the locking means base extending from the first end to the second end of the locking means base, the first center channel is aligned with the channel aperture disposed in the mounting base;
      (ii) a sliding tube slidably and telescopically received in the first center channel of the locking means base, a first end of the sliding tube extends above the first end of the locking means base and a second end of the sliding tube is housed within the first center channel of the locking means base, wherein a second center channel is disposed in the sliding tube extending from the first end to the second end of the sliding tube;
      (iii) a spring housed in the first center channel, the spring is sandwiched between the second end of the sliding tube and the top surface of the mounting base, the spring biases the sliding tube upwardly;
      (iv) a shaft extending through the second center channel of the sliding tube, the first center channel of the locking means base, and the channel aperture in the mounting base, wherein threading is disposed on at least a portion of the shaft at or near a first end of the shaft, the shaft can be rotated in a first direction or a second direction;
      (v) first T-bar disposed on the first end of the shaft and a second T-bar disposed on a second end of the shaft, the first T-bar is positioned above the first end of the sliding tube and the second T-bar is positioned below the bottom surface of the mounting base; and
      (vi) a wing nut disposed on the threading on the shaft in between the first end of the sliding tube and the first T-bar, the wing nut can move in a first direction and a second direction on the threading wherein when the wing nut is moved in the first direction on the threading the wing nut moves toward the second T-bar effectively pushing down on the sliding tube, compressing the spring, and moving the shaft upwardly effectively raising the second T-bar toward the bottom surface of the mounting base, when the wing nut is moved in the second direction on the threading, the wing nut moves toward the first T-bar.

2. The fishing rod holder device of claim 1, wherein the angle is between about 0 to 10 degrees.

3. The fishing rod holder device of claim 1, wherein the angle is between about 10 to 20 degrees.

4. The fishing rod holder device of claim 1, wherein the angle is between about 20 to 30 degrees.

5. The fishing rod holder device of claim 1, wherein the angle is between about 30 to 40 degrees.

6. The fishing rod holder device of claim 1, wherein the angle is between about 40 to 50 degrees.

7. The fishing rod holder device of claim 1, wherein the angle is between about 50 to 60 degrees.

8. The fishing rod holder device of claim 1, wherein the angle is between about 60 to 70 degrees.

9. The fishing rod holder device of claim 1, wherein the angle is between about 70 to 80 degrees.

10. The fishing rod holder device of claim 1, wherein the angle is between about 80 to 90 degrees.

11. The fishing rod holder device of claim 1, wherein the locking means base is generally cylindrical.

12. The fishing rod holder device of claim 1 further comprising a lock nut disposed on the threading on the shaft below the first T-bar.

13. A method of securing a fishing rod to a dock, said method comprising:
   (a) providing a fishing rod holder device comprising a mounting base; a pole holding tube extending upwardly from a top surface of the mounting base, the pole holding tube is positioned at an angle with respect to the top surface of the mounting base; a drainage hole disposed in the mounting base below the pole holding tube and a channel aperture disposed in the mounting base, both the drainage hole and the channel aperture extend from the top surface of the mounting base to a bottom surface of the mounting base; and a locking means for securing the mounting base to a dock, said locking means comprising:
      (i) a locking means base extending upwardly from the top surface of the mounting base, the locking means base has a first end and a second end, wherein a first center channel is disposed in the locking means base extending from the first end to the second end of the locking means base, the first center channel is aligned with the channel aperture disposed in the mounting base;
      (ii) a sliding tube slidably and telescopically received in the first center channel of the locking means base, a first end of the sliding tube extends above the first end of the locking means base and a second end of the sliding tube is housed within the first center channel of the locking means base, wherein a second center channel is disposed in the sliding tube extending from the first end to the second end of the sliding tube;
      (iii) a spring housed in the first center channel, the spring is sandwiched between the second end of the sliding tube and the top surface of the mounting base, the spring biases the sliding tube upwardly;
      (iv) a shaft extending through the second center channel of the sliding tube, the first center channel of the locking means base, and the channel aperture in the mounting base, wherein threading is disposed on at least a portion of the shaft at or near a first end of the shaft, the shaft can be rotated in a first direction or a second direction;

(v) first T-bar disposed on a first end of the shaft and a second T-bar disposed on a second end of the shaft, the first T-bar is positioned above the first end of the sliding tube and the second T-bar is positioned below the bottom surface of the mounting base; and (vi) a wing nut disposed on the threading on the shaft in between the first end of the sliding tube and the first T-bar, the wing nut can move in a first direction and a second direction on the threading;

(b) sliding the second T-bar in between two parallel planks of a dock;

(c) rotating the first T-bar between about 10 to 170 degrees effectively rotating the second T-bar between about 10 to 170 degrees;

(d) rotating the wing nut in the first direction causing the wing nut to push downwardly onto the first end of the sliding tube, the sliding tube to compress the spring, and the shaft to move upwardly effectively raising the second T-bar toward the bottom surface of the mounting base, the wing nut is rotated until the second T-bar and mounting base squeeze the planks of the dock sufficiently to immobilize the mounting base; and (e) inserting a fishing rod into the pole holding tube.

14. The method of claim 13, wherein the angle is between about 0 to 20 degrees.

15. The method of claim 13, wherein the angle is between about 20 to 40 degrees.

16. The method of claim 13, wherein the angle is between about 40 to 60 degrees.

17. The method of claim 13, wherein the angle is between about 60 to 90 degrees.

18. The method of claim 13, wherein the locking means base is generally cylindrical.

19. The method of claim 13, wherein the fishing rod holder device further comprises a lock nut disposed on the threading on the shaft below the first T-bar.

20. The method of claim 13, wherein the first T-bar is rotated about 90 degrees effectively rotating the second T-bar about 90 degrees.

* * * * *